| United States Patent [19] | [11] | 4,104,359 |
|---|---|---|
| Davis et al. | [45] | Aug. 1, 1978 |

[54] REGENERATION OF ORGANIC EXTRACTANTS CONTAINING α-HYDROXYOXIMES

[75] Inventors: Phillip K. Davis, Boise, Id.; Helen S. Leaver, Denver, Colo.; Henry Freiser, Tucson, Ariz.

[73] Assignee: Amax Inc., Greenwich, Conn.

[21] Appl. No.: 772,559

[22] Filed: Feb. 28, 1977

[51] Int. Cl.$^2$ .................... C01G 51/00; C01G 53/00; C07C 131/14

[52] U.S. Cl. .................... 423/139; 423/DIG. 14; 75/101 BE; 260/566 A

[58] Field of Search ............. 423/139, 24, DIG. 14; 75/101 BE; 260/566 A; 210/30 R

[56] References Cited

U.S. PATENT DOCUMENTS

| 2,270,204 | 1/1942 | Schlack | 260/566 A |
| 2,579,851 | 12/1951 | Novotny | 260/566 A |
| 4,018,865 | 4/1977 | Gallacher | 423/139 |

FOREIGN PATENT DOCUMENTS 1,138,750  1/1969  United Kingdom ............... 260/566 A
1,441,174  6/1976  United Kingdom ............... 260/566 A

OTHER PUBLICATIONS

Smith "The Chemisty of Open-Chain Organic Nitrogen Compounds" vol. II, W.A. Benjamin, Inc. N.Y., 1966, pp. 36-40, 63, 64.

Primary Examiner—Brian Hearn
Attorney, Agent, or Firm—Michael A. Ciomek

[57] ABSTRACT

An organic liquid extractant of at least one oxime, selected from the group consisting of ketoximes and α-hydroxyoximes dissolved in an organic solvent, useful in separating nickel from cobalt in process solutions or in recovering both nickel and cobalt from process solutions, is treated with a salt of hydroxylamine at intervals to maintain the activity of the oxime in the extractant. The organic extractant can also contain sulfonic acids to facilitate treatment of more acid process solutions and is treated with a hydroxylamine salt to regenerate oxime degraded by the highly acid process solutions, the extractant itself and the concentrated acidic stripping solutions.

1 Claim, No Drawings

REGENERATION OF ORGANIC EXTRACTANTS CONTAINING α-HYDROXYOXIMES

BACKGROUND OF THE INVENTION

The present invention relates to liquid-liquid extraction techniques and more particularly to a process for regenerating an active component of an organic extractant.

Solvent extraction and liquid ion exchange processes for recovering and separating metal values from process solutions are well known in any art. An Example of one such process is disclosed in U.S. Pat. No. 3,224,873. In the process disclosed in this patent, cobalt is separated from nickel process solutions by use of organic extractants comprising α-hydroxyoximes dissolved in a water immiscible solvent. The cobalt is stripped from the loaded extractant by contact with a strong mineral acid solution. High acid concentrations in both the process and stripping solutions cause degredation of the α-hydroxyoximes. If the organic extractant contains other acidic components, these components can also cause degradation of the α-hydroxyoximes. Degradation of the α-hydroxyoximes in the organic extractant becomes even more of a problem when the extractant is used at elevated temperatures.

Although much attention has been focused on the minimization of losses of active components of the organic extractant to the raffinate and/or to the stripping solution to enhance process economics, little, if any, attention has been directed to the problem of the degradation of active components in the organic extractant and the regeneration thereof.

Heretofore, the problems associated with degradation of active components of the organic extractant have been solved by adding fresh active components to the organic extractant. The addition of fresh active components to the organic extractant does not cure the problem of active component degradation but only maintains the extractive potential of the extractant while incurring reagent costs.

BRIEF SUMMARY OF THE INVENTION

The present invention relates generally to a process for regenerating a degraded active component in an organic extractant. An organic extractant comprising at least one oxime selected from the group consisting of ketoxime and an α-hydroxyoxime dissolved in a water immiscible organic solvent and containing oxime degradation products is contacted with at least one hydroxylamine salt whereby the salt reacts with the degradation products to regenerate the oxime.

DETAILED DESCRIPTION OF THE INVENTION

The process in accordance with the present invention is useful in treating organic extractants containing degradation products of at least one oxime selected from the group consisting of ketoximes and α-hydroxyoximes regardless of the nature of the process solution being treated by the organic extractant. For the purposes of facilitating description of the invention, the invention will be described in conjunction with treatment of nickel and cobalt-containing acid process solutions. An example of such process solutions is a pregnant leach solution derived from the sulfuric acid leaching of nickeliferours lateritic ores. These solutions can contain between about 3 grams per liter (gpl) and about 5 gpl nickel, between about 0.4 gpl and about 0.6 gpl cobalt, between about 8 gpl and about 12 gpl magnesium, between about 3 gpl and about 5 gpl manganese and between about 1 gpl and about 35 gpl free sulfuric acid. As these pregnant solutions are usually derived from the pressure leaching of nickeliferous lateritic ores at temperatures in excess of 200° C, the solutions are generally treated for nickel and cobalt recovery at temperatures of about 50° C in order to minimize heat or cooling costs.

In most liquid-liquid extraction processes in which one or more metal values are extracted from acidic aqueous solutions the pregnant solution must first be treated to neutralize a substantial portion of any residual free acid. Sufficient free acid is neutralized to adjust the pH value of the solution to a value of between about 0.9 and 5. However, it has recently been found that nickel and cobalt can be selectively removed from acidic leach solutions having pH values below about 2, and preferably between about 1.5 and 1.0. The separations of nickel and cobalt from such highly acid leach solutions is effected by contacting the leach solution with an organic extractant containing a mixture of active components; more specifically the organic extractant comprising at least one oxime selected from the group consisting of ketoximes and α-hydroxyoximes and a sulfonic acid both dissolved in a water immiscible organic solvent. The high free acid concentrations of the leach liquor as well as the acid character of the sulfonic acid accelerate degradation of the oxime contained in the organic extractant.

The organic extractants that can be treated in accordance with the process of the present invention have as their active components at least one oxime, advantageously an α-hydroxyoxime, dissolved in a water immiscible solvent. The α-hydroxyoximes that are degraded when treating highly acid solutions and which can be regenerated in accordance with the present invention can be symbolically represented by the following structural formula:

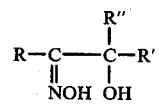

wherein R, R' and R" can be any of a variety of hydrocarbon radicals, such as aliphatic or alkylaryl radicals. R" may also be hydrogen. Advantageously, R and R' are unsaturated hydrocarbons or branched chain alkyl groups containing from about 6 to 20 carbon atoms. R and R' are preferably the same and when alkyl are preferably attached to the carbons substituted with the —OH and =NOH groups through a secondary carbon atoms. Examples of mono- and polyunsaturated radicals are heptenyl, octenyl, decenyl, octadecenyl and alkyl substituted radicals such as ethyloctadecenyl. Examples of other mono- and polyalkyl substituted saturated radicals are ethylhexyl, diethylheptyl, butyldecyl, butylhexadecyl, ethylbutyldecyl, butylcyclohexyl and the like. Specific examples of useful α-hydroxyoximes are 5, 8-diethyl-7-hydroxydodecane-6-oxime, 19-hydroxyhexatriconta-9, 27-dien-18-oxime and 5, 10-diethyl-8-hydroxytetradecon-7-oxime.

The ketoximes that can be used in accordance with the process of the present invention have the formula

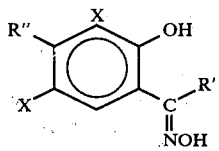

in which the oxime group is in the anticonfiguration with respect to the hydroxyl group, wherein R' is an alkyl or alkenyl group, R" is an optionally substituted alkyl, alkenyl, aryl, alkoxy, or acyloxy group, and each X is a hydrogen atom or an electron-withdrawing group, and the groups R' and R" and X contain a total of between 5 and 20 alkyl or alkenyl carbon atoms.

As examples of electron-withdrawing groups there are mentioned halogen atoms for example bromine and, especially, chlorine atoms, cyano, nitro and trifluoromethyl groups, alkoxycarbonyl groups for example methoxy carbonyl, ethoxycarbonyl, octyloxycarbonyl and nonyloxycarbonyl, and optionally-substituted aminocarbonyl groups for example carbamyl and methylaminocarbonyl. Ketoximes in which the group X in the position ortho to the hydroxyl group is not a hydrogen atom provide especially stable metal complexes.

As examples of groups which may be represented by R' there are mentioned alkyl groups which may be primary, secondary or tertiary and either straight-chain or branched, for example methyl, butyl, octyl, nonyl, undecyl, and dodecyl and alkenyl groups for example alkyl, dodecenyl, octenyl and decenyl.

As examples of groups which may be represented by R" there are mentioned the optionally-substituted alkyl and alkenyl groups which may be represented by R' and also aryl groups for example phenyl, o-, m- and p-tolyl, p-nonylphenyl and p-tert.butylphenyl, alkoxy groups for example methoxy, ethoxy, tert.-butoxy, nonyloxy, dodecyloxy, aryloxy for example, phenoxy, tolyloxy, p-octylphenoxy and p-nonylphenoxy, acyloxy groups, for example, acetoxy, benzoyloxy, caproyloxy, and stearoyloxy, and substituted derivatives thereof for example benzyloxy, p-dodecylbenzyloxy and p-nonylphenoxy.

R" is preferably an alkyl or alkoxy group. As examples of ketoximes which may be used in the extraction of metal values there are mentioned 4-methyl-2-hydroxyphenyl undecyl ketoxime, 4-methyl-2-hydroxyphenyl-2', 4', 4'-trimethylpentyl ketoxime, and 4-methyl-2-hydroxyphenyl n-pentyl ketoxime.

Only ketoximes having the oxime group in the anticonfiguration are effective in extracting metal values from acidic aqueous solutions. Conventional processes for producing ketoximes generally form mixtures of syn- and anticonfiguration of the oxime and these mixtures can be employed in the organic extractant.

The sulfonic acids incorporated in the organic extractant have the general formula:

wherein R is a hydrocarbon substituent and advantageously an aromatic hydrocarbon. Examples of useful sulfonic acids include dinonylnaphthalenesulfonic acid and dodecylbenzene sulfonic acid.

The solvents in which the hereinabove described components can be dissolved should have a number of properties. The solvents should be immiscible with water, should dissolve substantial amounts of the α-hydroxyoximes, should be inert to concentrated mineral acid solutions, and should dissolve the nickel and cobalt reaction products formed when the aqueous phase is contacted with the organic phase. These properties are generally found in hydrocarbon solvents containing aliphatic and/or aromatic and/or cyclic compounds in any combination. Specific examples are kerosene, mineral spirits, naphtha, toluene, benzene and xylene.

When nickel and/or cobalt are being separated from highly acid process solution the relative amount of oximes, particularly α-hydroxyoximes, and sulfonic acid employed have a significant impact on both the selectivity and the extent of extraction (i.e. recovery). Acceptable selectivity and commercially attractive recoveries are achieved at the molar ratios of sulfonic acids to α-hydroxyoximes between about 1:4 and about 2:1. Best results are realized if the molar ratios of sulfonic acids to α-hydroxyoximes are maintained between about 1:2 and about 1:1. The organic extractant should contain, on a weight basis, at least about 5% α-hydroxyoximes, at least about 5% sulfonic acid and up to about 20% of at least one conditioner selected from the group consisting of long chain alcohols and tributylphosphate, all dissolved in a water immiscible organic solvent. Advantageously, the liquid extractant contains between about 5% and about 20% oximes (advantageously α-hydroxyoximes), between about 5% and about 20% sulfonic acid and up to 20% of a conditioner, all dissolved in a water immiscible organic solvent. Most advantageously, the liquid extractant contains between about 10% and about 20% α-hydroxyoxime, between about 10% and about 20% sulfonic acid, and up to 10% of a conditioner all dissolved in a water immiscible organic solvent. Liquid extractants falling within the foregoing compositional ranges are particularly advantageous in that they provide effective and efficient separation of nickel and cobalt from highly acid solutions while minimizing the number of unit operations.

Extraction of metal values from the leach liquor is effected by contacting the leach liquor with the liquid organic extractant. Any apparatus that provides good liquid-liquid contact between the organic aqueous phases can be employed. Advantageously, the extraction process is conducted on a countercurrent basis, either with a series of mixing-settling stages or in one or more extraction columns. Extraction can be conducted at ambient temperatures or at elevated temperatures up to about 80° C, advantageously the process is conducted at temperatures between about 10° C and about 40° C and most advantageously at a temperature between about 15° C and about 35° C.

The use of extraction temperatures between about 10° C and about 30° C in conjunction with the regeneration process of the present invention is particularly advantageous. At extraction temperatures in excess of about 35° e.g. 40° C, the rate of degradation accelerates. At extraction temperatures below about 35° e.g. 30° C, the combination of low extraction temperatures and regeneration can extend the half-life of the extractant to 1400 days at 30° C from 38 days at 40° C, i.e. the half-life is increased about 35 times by lowering the extraction temperatures only 10° C.

The nickel-loaded extractant after being separated from the process solution, can be scrubbed with dilute mineral acid solution to scrub any co-extracted cobalt values, and the scrubbed nickel-loaded extractant is stripped by contact with concentrated mineral acid solutions. The stripped extractant can then be recycled to the nickel extraction stage. Both scrubbing and stripping can be conducted in the same manner as the extraction process.

Use of the above-described organic extractants in the manner described provides highly efficient removal and/or separation of metal values from aqueous process solutions, but a serious drawback of the above-descried extractants is their tendency to degrade upon exposure to highly acid stripping solutions. An important aspect of the present invention is the regeneration of the active oximes in the organic extractant, which oximes are the most susceptible to degradation by concentrated acid solutions. When the capacity of the organic extractant falls below a predetermined level, the organic extractant is regenerated by reacting the degraded organic extractant with a hydroxylamine salt. The capacity of the organic extractant is measured by the amount of metal value it can extract from process solutions as compared to that of the freshly prepared extractant. In most instances, when the capacity falls below about 90%, e.g. below about 75%, the organic extractant is regenerated in accordance with the present invention.

Specific examples of hydroxylamine salts include hydroxylamine sulfate, hydroxylamine hydrochloride, and hydroxylamine nitrate. Hydroxylamine salts that can be used to regenerate the $\alpha$-hydroxyoximes can be generally represented by the formula:

$$(NH_2OH)_nH_nX$$

wherein X is an anion, such as sulfate, chloride, nitrate acid-sulfate and $n$ is the anion valence.

Regeneration of the oximes can be accomplished by contacting the organic extractant containing degraded oxime with a solid hydroxylamine salt whereby the products of degradation react with the hydroxylamine salt to raise the concentration of the oxime to operating levels. In carrying the process in accordance with the present invention into practice, a stoichiometric excess of a hydroxylamine salt is added to a contact stage and the organic extractant containing the products of degradation is percolated past the salt thereby causing the products of degradation to react with the hydroxylamine salt. Only small amounts of hydroxylamine salt are dissolved and carried out of this contact stage. The hydroxylamine is scrubbed from the regenerated organic, recrystallized and returned to the contactor. Scrubbing is effected by contacting the organic phase with an aqueous solution of an inorganic salt, preferably a salt having the same anion as the salt of the hydroxylamine being used. For example, when hydroxylamine sulfate is being used to regenerate degraded $\alpha$-hydroxyoximes, an aqueous solution containing 100 gpl sodium sulfate can be used to scrub the regenerated $\alpha$-hydroxyoxime. An alternative means for effecting the reaction between the products of degradation and the hydroxylamine salt is to dissolve the hydroxylamine salt in an aqueous solution and then to contact the organic extractant containing the products of degradation with the aqueous solution in a conventional contacting system, such as a mixer-settler system or a packed tower. When using the latter alternative, the aqueous solution is saturated with the hydroxylamine salt.

In order to give those skilled in the art a better understanding of the present invention, the following illustrative examples are given:

EXAMPLE 1

A mixed organic extractant containing, by weight, about 17% 5, 8-diethyl-7-hydroxydodecane-6 oxime and about 10% dinonylnaphthalenesulfonic acid dissolved in kerosene were divided into four aliquot samples. The first sample (Sample No. 1) was placed in a covered glass flask, the second sample (Sample No. 2) was contacted at an organic to aqueous ratio of about 2 with about 8 N sulfuric acid. The third sample (Sample No. 3) was slurried with solid hydroxylamine sulfate. All three of these examples were magnetically stirred continuously for a period of 43 days. The fourth sample (Sample No. 4) was placed in a three stage extraction circuit using mixer-settlers. The first stage consisted of mixing with 8N sulfuric acid at an organic to aqueous ratio of about 1:1; the second stage consisted of a long mixer in which solid hydroxylamine sulfate was maintained in suspension by rapidly stirring the organic mixture without contact with aqueous phase.

The extent of degradation of the $\alpha$-hydroxyoxime in the organic extractant was determined by the response of each sample to loading from a standard shake-out procedure after being scrubbed twice with 2N sulfuric acid at an organic to aqueous ratio of about 2:2.

The loading contact was with a synthetic solution containing about 6 grams per liter (gpl) nickel, about 4 gpl manganese, about 10 gpl magnesium and adjusted using sulfuric acid to a pH value of about 3.5. The extent of degradation and/or regeneration used for comparison was a ratio of assays in grams per liter of nickel to the sum of manganese and magnesium in the loaded organic extractant. The results of these tests are summarized in Table 1.

TABLE 1

| SAMPLE NO. | ORGANIC PHASE ASSAY Ni: Mn + Mg | |
|---|---|---|
| | Day 5 | Day 43 |
| 1 | 4.9 | 4.2 |
| 2 | 5.0 | 3.5 |
| 3 | 5.4 | 4.7 |
| 4 | 5.4 | 4.7 |

The results reported in Table 1 confirm that the mere presence of sulfonic acid caused some degradation of the $\alpha$-hydroxyoxime during the test period of 43 days. The second test demonstrates that strong sulfuric acid solutions, such as those used in stripping operations, caused substantial degradation. On the other hand, tests 3 and 4 confirm that continual contact with hydroxylamine sulfate minimized the effects of the degradation of the $\alpha$-hydroxyoximes.

EXAMPLE 2

A mixed organic extractant containing 0.28N dinonylnaphthalene sulfonic acid in a 1.3N 5-8 diethyl-7-7 hydroxydodecane-6-oxime kerosene solution, was tested in a continuous mixer-settler circuit designed to extract and separate nickel and cobalt from aqueous leach solutions. After 18 days of circuit operation, the circuit was sampled and the hydroxyoxime added so that the organic extractant containing degraded $\alpha$-hydroxyoxime percolated through the hydroxylamine sulfate. The circuit was again sampled one and seven days after regeneration, and the amounts of active $\alpha$-hydroxyoxime was determined. The results are reported in Table 2.

TABLE 2

| Length of Operation, Days | Days Before(−)/After Hydroxylamine Addition | α-hydroxyoxime Remaining, V/O | Active Solvent %[1] |
|---|---|---|---|
| 0 | −18 | 30 | 100 |
| 18 | 0 | 26.8 | 89.3 |
| 19 | 1 | 27.2 | 90.7 |
| 25 | 7 | 27.3 | 91.0 |

[1]Volume of α-hydroxyoxime remaining divided by original volume of α-hydroxyoxime.

The present invention has been described by reference to advantageous embodiments, and is to be understood that modifications and variations can be resorted to without departing from the principles and scope of the invention, as those skilled in the art will readily understand. Accordingly, such modifications and variations are considered to be within the purview and scope of the invention and appended claims.

We claim:

1. A process for extracting at least one metal selected from the group consisting of cobalt and nickel from an acidic aqueous process solution which comprises maintaining the process solution at a temperature between about 10° C and about 40° C; contacting the process solution with a liquid extractant of at least one oxime selected from the group consisting of α-hydroxyoximes or a ketoxime which ketoxime has its oxime in the anticonfiguration with respect to the hydroxyl group and at least one sulfonic acid dissolved in a water immiscible organic solvent to load the organic extractant with the metal value; stripping the metal value from the loaded extractant with a concentrated aqueous solution of an inorganic acid to regenerate the organic extractant, recycling the regenerated extractant to the metal loading step and regenerating the organic extractant when its capacity falls below about 90% of its original capacity by reacting the organic extractant with a salt of a hydroxylamine.

* * * * *